Sept. 12, 1939.  F. SAWER  2,172,990
SKID RIM FOR RUBBER TIRE TRACTORS AND IMPLEMENTS
Filed March 4, 1938  2 Sheets-Sheet 1

Inventor
Frank Sawer

Sept. 12, 1939.  F. SAWER  2,172,990
SKID RIM FOR RUBBER TIRE TRACTORS AND IMPLEMENTS
Filed March 4, 1938  2 Sheets-Sheet 2

Inventor
Frank Sawer

Patented Sept. 12, 1939

2,172,990

UNITED STATES PATENT OFFICE 2,172,990

SKID RIM FOR RUBBER TIRE TRACTORS AND IMPLEMENTS

Frank Sawer, Ludell, Kans.

Application March 4, 1938, Serial No. 193,891

6 Claims. (Cl. 152—179)

This invention relates to an improvement in skid rims for rubber tire tractors and implements and more particularly to a skid rim attachment for tractor, or implement tires, and it consists in the combination, construction, and arrangements herein described and claimed.

The object of the invention is to provide a skid rim attachment for tractor and implement tires; when used on tractor tires, for working on lister ridges, or where more traction is needed in turning or holding side draft on implements.

A further object of the invention is to provide a device of the type described which may be quickly and easily attached and detached from a standard tractor or implement tire without removing the standard pneumatic tire therefrom.

A further object of the invention is to provide a device of the type described which is simple in construction, which is durable, and which is thoroughly practical for the purpose intended.

Other objects and advantages will appear in the following description and the novel features of the invention will be particularly pointed out in the appending claims.

Figure 1:
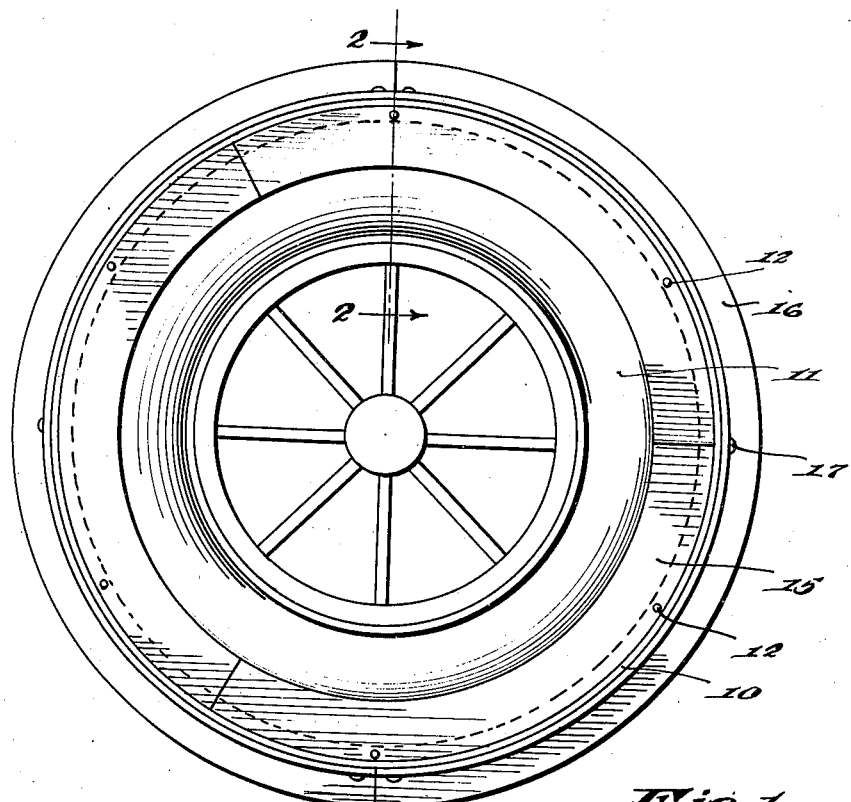
Figure 2:
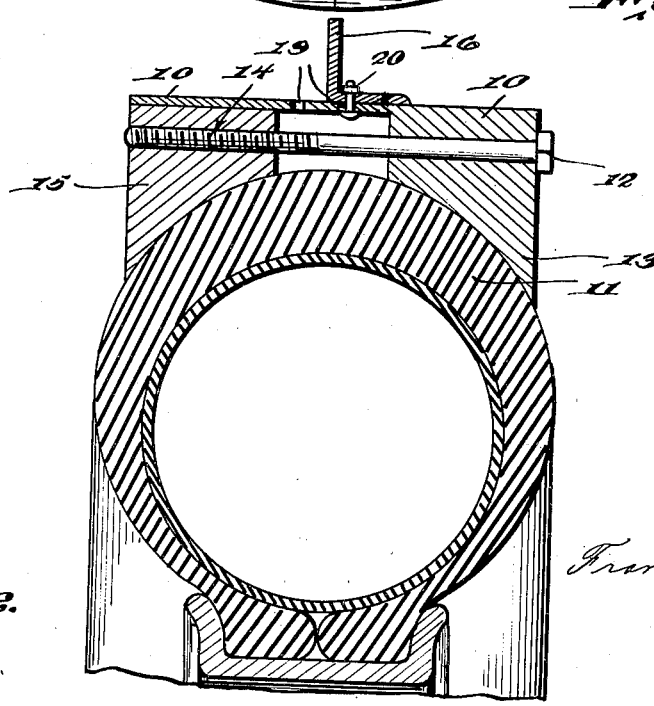
Figure 3:
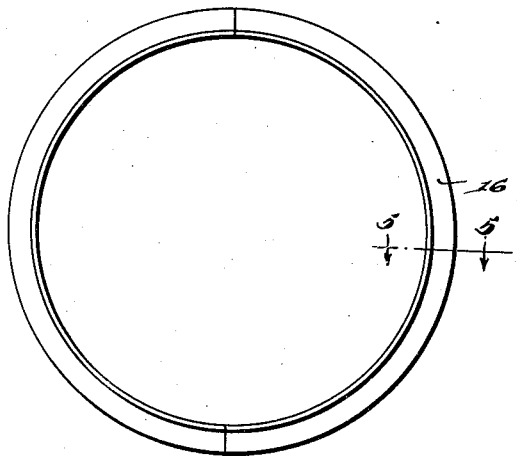
Figure 4:
Figure 5:
Figure 6:
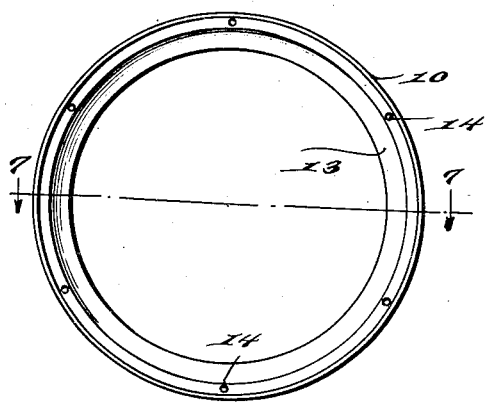
Figure 8:
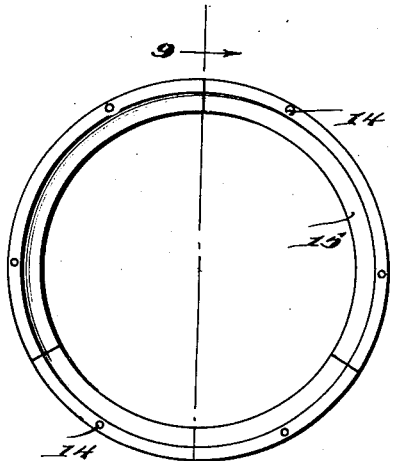
Figure 7:
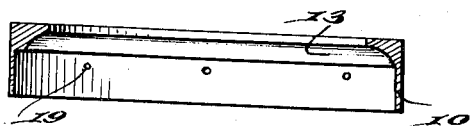
Figure 9:

The invention is illustrated in the accompanying drawings, forming part of this application, in which Fig. 1 is a plan view of a tire equipped with the skid rim attachment, Fig. 2 is a sectional view along the line 2—2 of Fig. 1, Fig. 3 is a side view of skid rim of which there are two parts, Fig. 4 is a top view of skid rim showing holes, Fig. 5 is a cross section of Fig. 4, Fig. 6 is a side view of iron rim to which is fastened a fixed lug by means of welding, Fig. 7 is a sectional view along the lines 7—7 of Fig. 6, Fig. 8 is a side view of removable iron lugs, Fig. 9 is a sectional view along the lines 9—9 of Fig. 8.

The skid rim is intended to be applied to a wheel of a conventional construction, a portion of which is shown in Fig. 1, and is made up of iron rim 10, which is formed of strong flat iron bent in a circular shape.

Its interior diameter is such that it may fit on the outside of tire 11 and let bolt 12 pass through between tire 11 and iron rim 10. To this iron rim 10 is welded or fastened fixed lug 13, Fig. 2, in which six holes 14 are tapped for bolt 12, as in Figs. 2 and 6.

Removable iron lug 15 is made in three pieces, as in Fig. 8, which has two holes 16 in each to match the holes 14 in Fig. 6. Removable iron lug, Fig. 2, can be adjusted in and out to clamp on tire 11 with bolt 12 by screwing in and out. The bolt 12 should have just enough room to pass through between iron rim 10 and tire 11, Fig. 2. Skid rim 16, Fig. 3, is fastened to iron rim 10, as in Fig. 2, by three bolts, 17 in each half skid rim, as in Fig. 4.

Each half skid rim 16 has two holes 18 in each place, Fig. 4, or a total of 6 holes in each half skid rim.

The flat iron rim 10 also has two holes 19, Fig. 2, in each place or a total of twelve holes in the complete rim. These two holes 19, Fig. 2, are wider apart than the two holes 18 in Fig. 4. The cutter rim 16, Fig. 3, is fastened to iron rim 10, Fig. 2, by means of one bolt 20, in each place, Fig. 2.

The idea for the extra holes 19 in iron rim 10 and extra hole 18 in cutter rim is that they are used in changing cutter 16 to several positions on the iron rim 10. The cutter 16 can even be turned half way around.

The purpose of this rim 16 being changeable is for different width tractors so they will fit the ridges better.

It is to be understood that the form of my invention herein shown and described is to be taken as a preferred example of the device and that certain changes in the shape, size and arrangement of the parts may be made without departing from the spirit of the invention or the scope of the subjoined claims.

Having thus described my invention, I claim:

1. A skid rim for rubber tired wheels of the character disclosed comprising an annular traction section adapted to encircle the wheel tire, and formed about one edge with an inwardly directed lug adapted to seat against the side wall of the rubber tire, an annular lug adjustably fitted within the said annular section and shaped to seat against the opposite side wall of the tire, and means fixedly connecting the said annular lug with the said annular section to retain the skid rim functionally on a wheel.

2. A skid rim as stated in claim 1, wherein the said means that connects the annular lug with the said annular section comprises a plurality of bolts extended rotatably through the lug at one side of the wheel and threaded onto the lug at the opposite side, whereby the movable lug can be drawn into the annular section to effect the clamping of the said lugs against opposite sides of a tire to which the skid rim may be applied.

3. A skid rim as stated in claim 1 wherein the annular section is adapted to encircle the wheel with a clearance space between them, and wherein the means whereby the said annular lug is adjusted and secured comprises a plurality of removable, threaded bolts that are extended rotatably through the said inwardly directed lug of the annular section, through the clearance space, and are threaded into the annular lug to effect a clamping action of the lugs against opposite sides of a wheel tire to which the skid rims may be applied.

4. A skid rim for rubber tired wheels of the character described comprising an annular, flat rim section adapted to encircle the wheel tire with clearance space between them; said rim section having an inwardly directed lug extending thereabout at one edge formed with a seat to engage against the outer side wall of the wheel tire, an annular lug composed of a plurality of arcuate sections, movably fitted within the rim section and formed with seats to engage against the inner side wall of the wheel tire, and a plurality of bolts extended through the inwardly directed lug of the annular flat rim section, through the said clearance space and threaded into said arcuate lugs whereby the lugs may be clamped against opposite sides of the wheel tire to hold the skid rim functionally associated with a wheel to which it is applied.

5. A skid rim for rubber tired wheels of the character described, comprising an annular, flat rim section adapted to encircle the wheel tire, means on said annular section to seat against one side wall of the wheel tire, means fitted within the rim section for seating against the opposite side wall of the wheel tire, tightening bolts extended between said means at the opposite sides of the wheel tire to draw them together, thus to clamp the skid rim on a wheel tire, and a cutter flange fixed to and encircling the annular flat rim section.

6. A skid rim for wheels equipped with tires of the character described, comprising an annular traction section adapted for encircling the wheel tire in the plane of the wheel, complemental clamping means fitted within the traction section and adapted to engage against opposite side walls of the tire in opposed relation; the said clamping means at one side of the tire being fixed to the traction section and those at the other side being adjustable therein, and clamping bolts joining the complemental clamping means transversely of the tire.

FRANK SAWER.